Dec. 13, 1927.

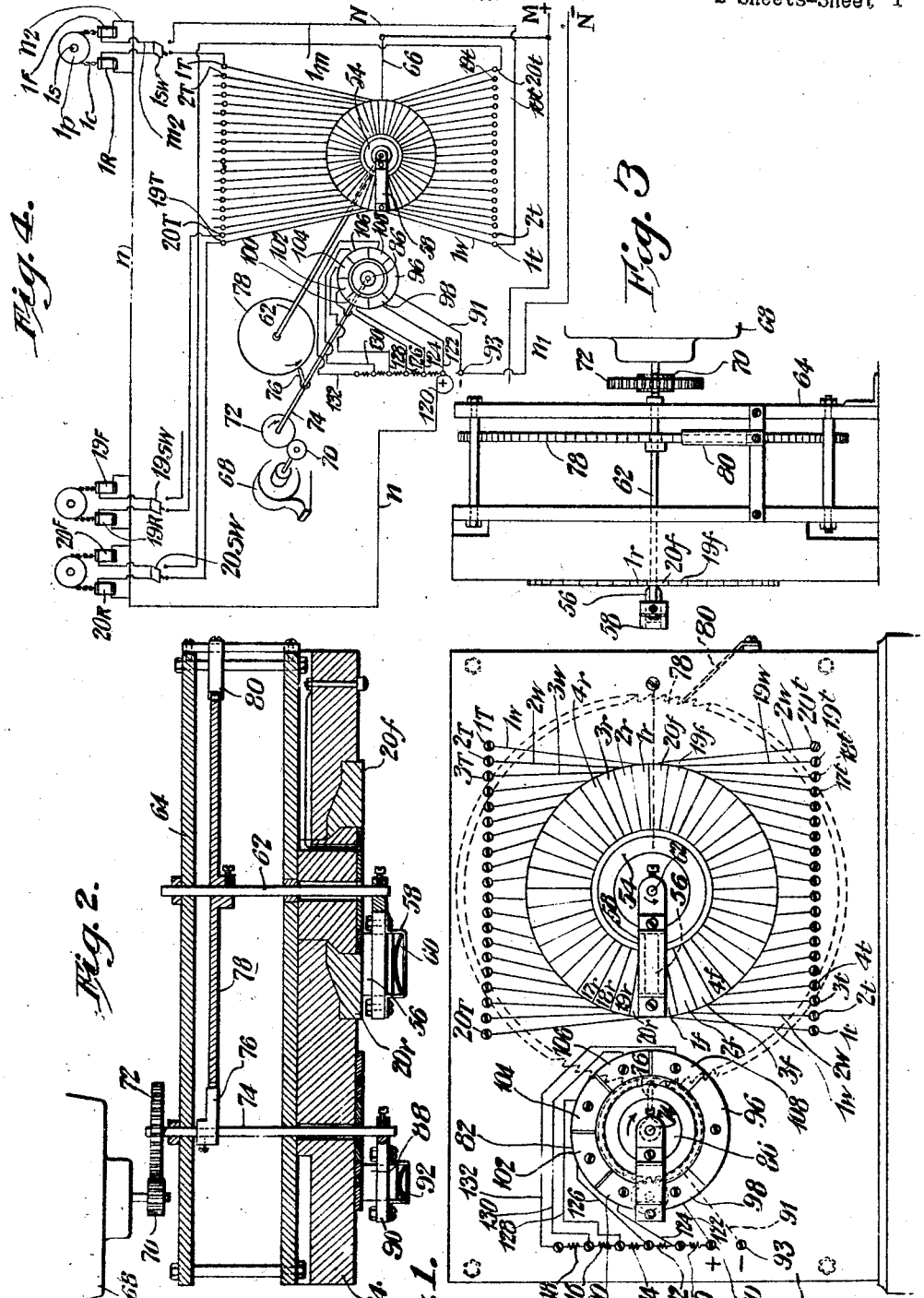

H. L. HERZIG 1,652,624

VALVE REVERSING MECHANISM

Filed Aug. 9, 1922 — 2 Sheets-Sheet 2

Inventor
Harold L. Herzig.
By His Attorney
Edmund G. Borden.

Patented Dec. 13, 1927.

1,652,624

UNITED STATES PATENT OFFICE.

HAROLD L. HERZIG, OF TOLEDO, OHIO, ASSIGNOR, BY MESNE ASSIGNMENTS, TO COMBUSTION UTILITIES CORPORATION, OF NEW YORK, N. Y., A CORPORATION OF MAINE.

VALVE-REVERSING MECHANISM.

Application filed August 9, 1922. Serial No. 580,818.

The present invention relates to a reversing mechanism and more particularly to an electrically operated valve reversing mechanism, which is adaptable for operating a series of valves, and may be applied to the operation of air and gas valves of a series of regenerator furnaces for reversing the valves at predetermined times and in any desired order.

In the operation of regenerative furnaces it is necessary to have positive actuating means for reversing the various valves of the apparatus, in order to reverse the direction of the admission of air and gas. The means ordinarily employed for this purpose are mechanical devices of complicated design, which are expensive in operation and upkeep, and require frequent attention to provide proper lubrication and operation of the various parts thereof. In the application of such mechanical devices to the operation of a large number of furnaces the multiplicity of mechanically operated parts renders the operation complex and the cost of operation increases in arithmetical proportion to number of furnaces. By the application of the electrically operated valve shifting device of the present invention to the operation of regenerative furnaces the operation of a large number of such furnaces is not materially more complex than the operation of a small number of such apparatus, and the number of parts required in the operation increases in a decreasing ratio with the number of furnaces operated.

It is the primary object of the present invention to provide an apparatus for electrically controlling the operation of valves and other devices where the operation is to be carried on simultaneously or in series, or in any desired sequence.

A second object of the invention is to provide a valve reversing device which may be employed for the simultaneous operation of a large number of furnaces, or other apparatus depending for its operation on the positive operation of valves or other control devices at definite time intervals and in certain sequences whereby the operation may be supervised and controlled from one central point.

Another object of the invention is to reduce the cost of operation of valve shifting mechanisms.

A further object of the invention is to materially reduce the number of parts required for the operation of valve reversing mechanism whereby substantially any number of furnaces or valves may be operated from a central point under the control of a single operator.

With these and other objects in view, the invention comprises the various features set forth in detail in connection with the accompanying drawing, in which:

Fig. 1 represents a side elevation of a portion of the electrical control mechanism, showing the brushes and contact members through which electrical connection is made to the valve operating solenoids;

Fig. 2 represents a horizontal sectional view of the apparatus of Fig. 1 showing the motor connection by which power is supplied to operate the brushes to attain the desired electrical connections;

Fig. 3 is a profile view of the apparatus of Fig. 1;

Fig. 4 is a diagrammatic representation of the apparatus of Figs. 1, 2 and 3 as applied to the operation of valve reversing solenoids showing the connections to an electrical circuit;

Figure 5:
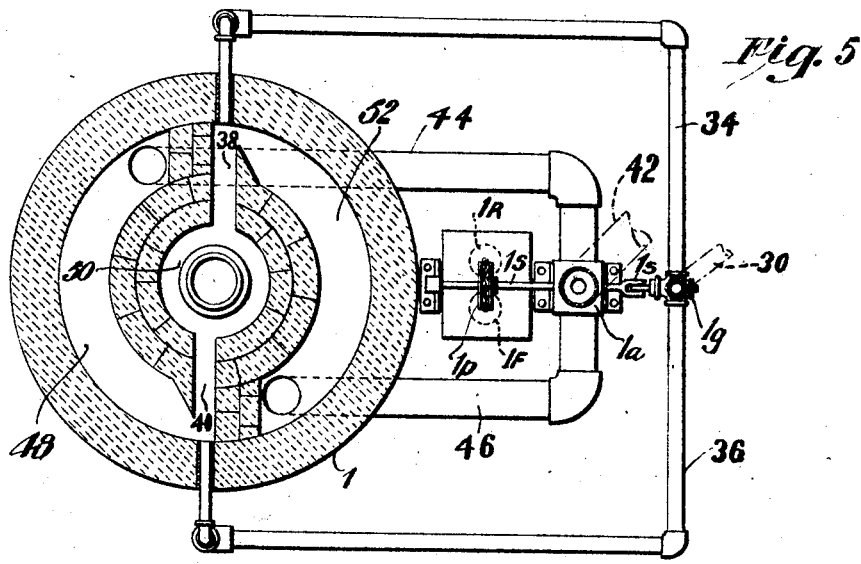
Fig. 5 is a sectional plan view of a gas operated regenerative furnace, showing the air and gas ducts connected thereto and the arrangement of valves in the ducts.
Figure 6:
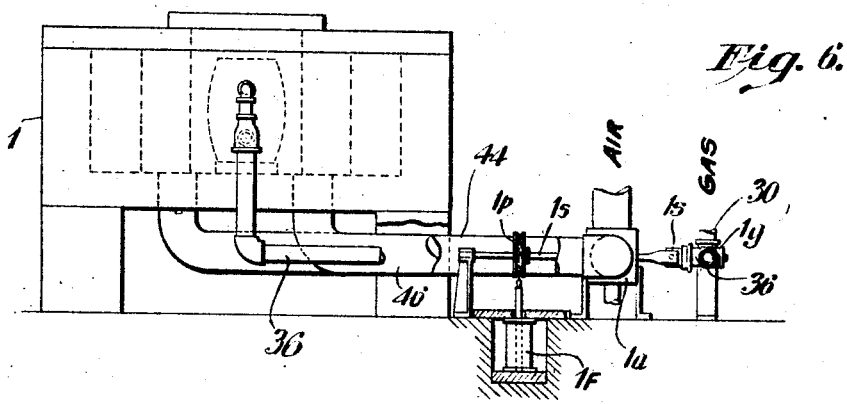
Fig. 6 is an elevational view of the apparatus of Fig. 5 showing the position of the operating solenoids with respect to the valves.

The apparatus of Figs. 1, 2 and 3 is employed in connection with a bank or series of furnaces constructed similarly, for instance, to that shown in Figs. 5 and 6, wherein air and gas are supplied through ducts in one or another direction to a furnace, the direction of supply being dependent upon the position or set of the valves in the ducts. In a regenerative furnace of the type shown in Figs. 5 and 6 gas is fed through a pipe 30 in which there is a three-way valve $1^s$ serving to connect the pipe 30 with a pipe 34 or a pipe 36. The latter pipes communicate with burner nozzles which direct the gas into combustion passages 38 and 40 of the furnace. Air is supplied to a pipe 42 which communicates through a four-way valve $1^a$ with pipes 44 and 46, which serve alternately as supply and exhaust pipes. In the operation of the furnace, when the direction of supply of gas is through the pipe 36, air is fed through the pipe 44 and passes through the preheating passage 48, uniting with the gas fed through pipe 36 in the passage 40, and generating through the combustion thereof the requisite heat in the heat chamber 50 of the furnace. From the heat chamber 50 the gases of combustion pass through passage 38 into passage 52 which becomes heated to a high temperature by the gases passing therethrough. The combustion gases after passing through the passage 52, flow through pipe 46 to the four-way valve $1^a$ by which they are directed into a stack or into the atmosphere, as desired. After a certain interval of time, dependent upon the temperature to which the air passing through passage 48 is heated, and also upon the temperature to which the walls of passage 52 become heated by the outgoing gases of combustion, the direction of supply of air and gas is reversed by reversing the valves $1^a$ and $1^s$. Gas is then fed through the pipe 34 leading to passage 38 and air is fed through the air duct 46 and becomes preheated in the passage 52 through the heat stored in the walls of the passage from the previous heating by means of outgoing combustion gases. Combustion of gas then takes place in the passage 38, and gases of combustion heated to a high temperature pass through the chamber 50, where the desired heating takes place, and pass from thence to exhaust through passages 40, 48 and duct 44, through valve $1^a$ to the stack or atmosphere. It is the purpose of the present invention to operate a number of the furnaces similar to furnace described above by controlling the operation of the valves similar to $1^a$ and $1^s$ by automatic means which may be controlled from a central point. For this purpose the valves $1^a$ and $1^s$ are connected by a shaft $1^s$ in order to make the operation of the valves interdependent, and valve $1^a$ is connected to a shaft $1^s$. A pulley $1^p$ is fixed on the shaft $1^s$ and a chain $1^c$ which passes over the pulley is connected at its opposite ends to cores of two solenoids $1^R$ and $1^F$. The solenoids $1^R$ and $1^F$ both act to draw the core or armature downwardly so that one rotates the valves in the opposite direction from the other to intermittently reverse the direction of flow of gas and air.

The operating coils of the solenoids $1^R$ and $1^F$ are connected to electrical mains M and N, Fig. 4, through switches which are operated mechanically to make and break connections periodically between the main line and the coils. The switching and operating mechanism therefor are shown diagrammatically in Fig. 4 and the details of construction are shown in Figs. 1, 2 and 3. The switching mechanism shown in the drawings is adapted for operating the solenoids of a battery of furnaces and comprises a series of contacting plates or segments $1^f$, $2^f$, $3^f$, $4^f$, etc., and $1^r$, $2^r$, $3^r$, etc., which are made of copper or other suitable conducting material and are mounted on a panel in the form of an annular ring wherein the segments radiate outwardly from the center, a central distributing ring 54 concentrically mounted in the annular segmental ring, and a brush 56 rotatably mounted over the segments for making contact between the segments and the distributing ring 54. The subscripts $f$ of the segments indicate those segments which are connected in electrical circuit with the solenoid coils F, and the subscripts $r$ indicate the segments which are connected in electrical circuit with the solenoids R. The segments $1^f$, $2^f$, etc. and $1^r$, $2^r$, etc. are connected respectively to terminals $1^t$, $2^t$, etc., and $1^T$, $2^T$, etc., by means of conductors $1^w$, $2^w$, etc., and $1^W$, $2^W$, etc. The brush 56 is mounted in a holder 58 and is yieldably held in contact with the distributing rings and segments by a spring 60. The holder 58 is secured to a shaft 62, which is rotatably mounted in a frame 64. Preferably the brush is given a step by step movement to advance it intermittently the distance of one segment whereby contact between each successive segment and the distributing ring may be made. The distributing ring is connected through a conductor 66, Fig. 4, with the line M of the main line and the segments are in the circuit which connects with the line N of the main line. The intermittent movement of the brush is obtained by means of a motor 68 which is connected by gears 70 and 72, with a shaft 74 rotatably mounted in the frame 64. Upon the shaft 74 is fixed a tripping arm 76, which is arranged to intermittently engage a ratchet wheel 78 fixed upon the shaft 62. With each complete rotation of the tripping arm 76 it engages teeth in the peripheral edge of the ratchet wheel 78 and advances the ratchet wheel through a distance equal to the pitch of the teeth. To hold the ratchet wheel 78 in fixed position while the tripping arm completes its rotation, a spring locking pawl 80 is fixed in the frame 64 and arranged to engage the ratchet wheel at a point opposite the engagement of the tripping wheel.

One terminal of each of the valve operating solenoid coils is connected with a common ground or return wire and the other terminal of the solenoid coils is arranged to be connected through switches $1^{sw}$, $2^{sw}$, $3^{sw}$, etc., by conductors $1^m$, $2^m$, $3^m$, etc., with the terminals $1^t$, $2^t$, etc., and $1^T$, $2^T$, etc. By means of the switches $1^{sw}$, $2^{sw}$, etc., any pair of valve operating solenoids may be placed into or out of operation. The common return wire N is connected in series with a cutout and current reducing mechanism by which a circuit is made with the line N of the main line to complete the circuit for operating the solenoids.

The cutout and current reducing mechanism is shown more particularly in Figs. 1, 2, 3 and 4. This mechanism comprises an insulated ring 82 made up of a series of insulated segments mounted on a panel 84, a distributing ring 86 mounted within and insulated from the segmental ring 82, and a brush 88 mounted to rotate over the distributing ring and segmental ring to make contact between the distributing ring and the segments of the ring 82. The brush 88 is mounted in the holder 90 and is arranged to be yieldably held in contact with the segments 82 and ring 86 by means of a spring 92 mounted in the holder. The holder 90 is fixed upon the forward end of the shaft 74 and is continuously rotated by the motor 68. The segmental ring is preferably made up of seven segments 96, 98, 100, 102, 104, 106, and 108, as shown in the drawings. The segment 96 is made of a non-conducting or insulating material such as asbestos, and is therefore completely insulated from the remaining segments. When the brush 88 passes over the segment 96, the electrical current in the circuit will be interrupted, and this segment is arranged to pass under the brush during the time when the tripping arm 76 is in engagement with the ratchet wheel 78 to move the brush 56 from one of the switching segments $1^t$, $2^t$, etc., or $1^r$, $2^r$, etc., so that there will be no arcing as the brush moves from one segment to the next. The segments 98 to 108 inclusive are preferably made of a conducting material such as copper and each of these segments except segments 96 and 98 is in series with one or more of a series of resistances 110, 112, 114, 116, and 118. As the brush 88 is rotated in a clockwise direction as indicated by arrow in Figs. 1 and 4, the full current strength will pass through a solenoid while the brush is on segment 98 and then the series of resistances 110 to 118 are interposed one by one so as to reduce the current passing to the solenoid in circuit with the main line while the brush is passing over segments 100–108 inclusive. With the construction the full current will be passed through a solenoid for a sufficient period of time to reverse the position of the air and gas valves, then the current strength will be gradually reduced until it is entirely cut off.

The motor 68 may be operated at any desired speed, or may be geared to the shaft 74 by gears which will give any desired speed of rotation of the cutout switch mechanism, and of the brush of the solenoid switching mechanism. In this way the various valve operating solenoids may be arranged to be operated at any desired time interval, to effect the reversing of the air and gas valves. Although the solenoid operating switch is shown as having segments arranged to operate all of the forwardly operating valves in succession and then operate the rearwardly operating valves in succession, it is obvious that the terminals $1^t$, $2^t$, and $1^T$, $2^T$ may be connected by suitable conductors to obtain any desired sequence of operation of the solenoids.

The operation of the device is as follows: The motor 68, which is geared to the shaft 74 through gears 70 and 72 rotates the shaft 74 at a speed of approximately 10 R. P. M. The tripping arm 76 attached to the shaft 74 cooperates with a gear 78 on shaft 62, the gear being preferably so constructed as to move one forty-first of a turn with each revolution of the tripping arm. The spring 80 serves to maintain the gear in position after each turn by the tripping arm 76. At the time the brush 88 is passing in a clockwise direction over the insulating section of the switch or cut-out and current reducing mechanism, thus interrupting the current through the apparatus, the tripping arm 76 moves into contact with the gear 78 on the shaft 62, to which the brush 56 is attached. The brush 56 is thus moved in a counterclockwise direction from one segment to the next, as, for instance, from the segment $20^r$ to the segment $1^t$. During the rotation of the gear 78 the spring 80 is pressed against the teeth of the gear 78 and thus prevents movement of the gear after the tripping arm has moved out of contact therewith. After the brush 56 has moved into place on the segment $1^t$ the brush 88 moves over the conducting section 98 of the cut-out mechanism. A current then passes through the closed circuit from the wire M of main line MN through the wire 66 to the conducting ring 54, through the brush 56, segment $1^t$, through a wire $1^w$ connected therewith, to the terminal $1^t$, then through a wire $1^m$, through switch $1^{sw}$, which is closed during the operation of the apparatus, through wire $m^2$ connected to the coil of the solenoid $1^F$, and through the solenoid coil, through the return wire $n^2$ to the common connecting wire $n$, and from thence through wire $n$ to the plus terminal 120, and from thence through the lead wire 122 to the conducting section 98, from thence through the brush 88 to the inner ring 86, and from thence through the wire 91 to the terminal 93, and from thence through the lead wire $n^1$ to the wire N of the main MN, with which it is connected. By the passage of the current through the coil of the solenoid $1^F$, the core of the solenoid is drawn in, in the usual manner. The operation of the solenoid rotates the pulley $1^P$ with which it is connected through a suitable cord or chain $1^c$ passing thereover, and thus operates the valves 1ᵃ and 1ˢ of the furnace 1. After the brush 88 has rotated further so as to pass out of contact with the section 98 and into contact with the section 100, the current flows from the terminal 120 through the resistance 110 through the wire 124 to the section 100 and through the brush 88 to the main MN by the path outlined above. The interposing of the resistance 110 serves to cut down the current flowing through the coil of the solenoid 1ᶠ and as the other resistances are interposed the current is correspondingly reduced through the solenoid coil which is in circuit. After the brush 88 has finally rotated to the position where it is co-acting with the section 108 of the cut-out mechanism, the current passes from the terminal 120 through resistances 110, 112, 114, 116 and 118, and from thence through the wire 132 to the conducting section 108 of the switch and through brush 88 to the main MN in the manner above indicated. When the brush 88 again passes over the fibre or non-conducting segment 96 of the cut-out mechanism the tripping arm 76 moves again into contact with the gear 78 and thus rotates the brush 56 in a counterclockwise direction from the segment 1ᶠ to the segment 2ᶠ, and the valves of the next furnace 2, in the series are operated. In this manner the various solenoids and valves connected therewith are operated in any desired sequence, depending upon the arrangement of the various electrical connections. It is apparent therefore that any number of furnaces in any desired sequence may be operated by the means above disclosed.

The preferred form of the invention has been set forth in detail, but it is to be understood that various modifications may be made without departing from the spirit or scope of the invention.

Having thus described the invention, what is claimed as new is:

1. An electrical valve operating mechanism comprising a valve shaft, separate solenoids operatively connected to the said shaft to cause rotation thereof in clock-wise and counter clock-wise directions respectively, a switch for controlling the excitation of said solenoids, means operatively connecting said switch with each of said solenoids, operating means for the said switch, means connecting the said switch to the said operating means to cause operation of each of said solenoids at predetermined time intervals, and means associated with said switch whereby the excitation of each of said solenoids is decreased gradually to zero.

2. An electrical valve operating mechanism comprising a series of valve shafts, a pair of forward and reversely operating solenoids connected to each of said shafts, a switch for controlling the excitation of said solenoids, means connected to said switch to cause operation of said solenoids at predetermined time intervals, and means whereby the excitation of said solenoids is gradually cut off.

3. An electrical valve operating mechanism comprising a series of air and gas valve operating shafts, a pair of reversely operating electromotive means operatively connected to each of the said shafts, a switch for controlling the excitation of each of said electromotive means, means for periodically exciting each of said electromotive means through the said switch to cause rotation of the said valve shafts first in one direction and then in the other, and means associated with said switch whereby the excitation of each of said electromotive means is decreased gradually to zero.

4. An electrical valve operating mechanism comprising a series of valve operating shafts, a pair of reversely operating electromotive means operatively connected to each of the said shafts to cause rotation thereof in clock-wise and counter-clock-wise directions respectively, a switch, segments in the said switch each in circuit with one of the electromotive means, means for periodically exciting said electromotive means through said switch so as to rotate each one of said valve shafts at predetermined time intervals first in one direction and then in the other, and means associated with said switch whereby the excitation of each of said electromotive means is decreased gradually.

5. An electrical valve operating mechanism comprising a series of valves, shafts connected with said valves, solenoids connected with said shafts in operative relation therewith, a rotary switch having segments therein in circuit with the said solenoids, a source of electric power, a brush on the said switch, means for rotating the said brush to periodically connect each of the said solenoids with the source of electric power, means for disconnecting the said source of electric power during the rotation of the said brush from one segment to the segment next adjacent, and means for gradually reducing the excitation of the said solenoids subsequent to the operation thereof.

6. An electrical valve operating mechanism comprising a switch, a series of segments in the said switch, insulating sections separating the said segments, a conducting ring insulated from the said segments and connected in circuit with a main line, a brush adapted to rotate in a plane to make contact between the said ring and the said segments, means to rotate the said brush at definite time intervals from one segment to the next, and means connected in circuit with the said rotating means and the main line to break the current through the circuit during the passage of the said brush from one segment to the next, and to thereafter complete the circuit and to gradually insert resistance in the line until the current is again broken.

7. An electrical valve operating mechanism comprising a switch, a series of insulating segments in the said switch arranged in an annular path, a conducting ring, a brush adapted to maintain sliding contact between the said ring and the said segments, means to rotate the said brush at predetermined time intervals from one segment to the next adjacent, a second switch in series with the first mentioned switch, a series of insulated sections arranged in a circular path in the said switch, one of the said sections being of insulating material, a conducting ring constituting one pole of the said second switch, a second brush adapted to connect the said ring with one of the said sections, and means for rotating the said second brush in cooperative relation to the rotation of the first mentioned brush, so that the said second brush will contact with the said section of the insulating material during the rotation of the first mentioned brush from one segment to the next adjacent, thereafter causing the said brush to contact with a conducting section so as to permit passage of current through the said switches.

In testimony whereof I affix my signature.

HAROLD L. HERZIG.